Aug. 4, 1959     L. H. LA FORGE, JR., ET AL     2,898,273
METHOD FOR MAKING DISC-LOADED WAVEGUIDES
Filed May 24, 1956                                                          2 Sheets-Sheet 1

INVENTORS
LOUIS H. LaFORGE, JR.
RICHARD B. NEAL
ROBERT N. WHITEHURST

By Lippincott + Smith

ATTORNEYS

INVENTORS
LOUIS H. LAFORGE, JR.
RICHARD B. NEAL
ROBERT N. WHITEHURST

BY Lippincott & Smith

ATTORNEYS 2,898,273
Patented Aug. 4, 1959

2,898,273
METHOD FOR MAKING DISC-LOADED WAVEGUIDES

Louis H. La Forge, Jr., and Richard B. Neal, Palo Alto, Calif., and Robert N. Whitehurst, University, Ala., assignors to The Board of Trustees of The Leland Stanford Jr. University, Stanford University, Stanford, Calif.

Application May 24, 1956, Serial No. 587,008

3 Claims. (Cl. 204—9)

This invention relates to improved methods for making the disc-loaded waveguide sections that are used in linear accelerators, traveling wave structures, and the like.

A disc-loaded waveguide section for a linear accelerator or the like comprises a plurality of annular loading discs transversely disposed within and spaced along the length of a hollow cylindrical waveguide section. The dimensions and positions of the discs must be accurate to a high degree of precision. In the manufacture of such disc-loaded waveguides, the general practice heretofore has been to make the loading discs separately, and then to position and install the discs within a hollow cylindrical waveguide by some means such as brazing the discs into appropriate waveguide tubing or shrinking the waveguide tubing onto the discs. Disc-loaded waveguides manufactured by such prior-art methods are often more or less defective in that the loading discs are locked in the tubing at slight angles, or are otherwise incorrectly position, which produces errors in the size and shape of the accelerator cavities and causes undesirable losses of energy in the accelerated electron beam of a linear accelerator incorporating the waveguide section.

Accordingly, objects of this invention are to provide a simplified and improved method for making disc-loaded waveguide sections, to eliminate the aforesaid disadvantages, and to insure precise dimensioning and positioning of the loading discs. Other objects and advantages of the invention will appear as the description proceeds.

Briefly stated, in accordance with certain aspects of this invention, the loading discs and the cylindrical waveguide are made at the same time and as a single unitary part by electroplating silver or copper onto a grooved cylindrical plating core. The plating core is made by machining circumferential grooves into an aluminum cylinder. Consequently, well-known precision machining techniques can be employed to achieve precise dimensioning and positioning of the grooves. To obtain more uniform plating into the grooves, the grooves preferably are cut with rounded outside corners. After the electroplating operation is completed, the aluminum plating core is dissolved in a hot solution of sodium hydroxide and there is left an accurate electroformed negative of the plating core.

Because the silver or copper plating metal is deposited more rapidly at the outer than at the inner portions of the core grooves, there is a tendency for the plating metal to seal over the outer portions of the grooves before the grooves are completely filled with metal, which leaves cavities filled with entrapped plating solution. Unless some means is provided for the escape of this entrapped plating solution, it may cause subsequent damage to the waveguide, for example, during subsequent evacuation and bake-out operations. Passages for the escape of entrapped plating solution can be provided by drilling small holes from the outside of the waveguide into each of the cavities containing entrapped solution. However, this is a costly and time-consuming process. According to certain principles of the present invention, such passages for the escape of entrapped plating solution are provided simply and economically by positioning threads of "Orlon" or the like transversely within the grooves of the plating core prior to and during the electroplating operation. These threads burn when the waveguide is heated, during evacuation and bake-out for example, thereby providing passages for the escape of entrapped plating solution.

The invention will be better understood from the following detailed description taken in connection with the accompanying drawings, and its scope will be pointed out in the appended claims. In the drawings, Fig. 1 is a flow diagram of a process embodying principles of this invention;

Figure 1:
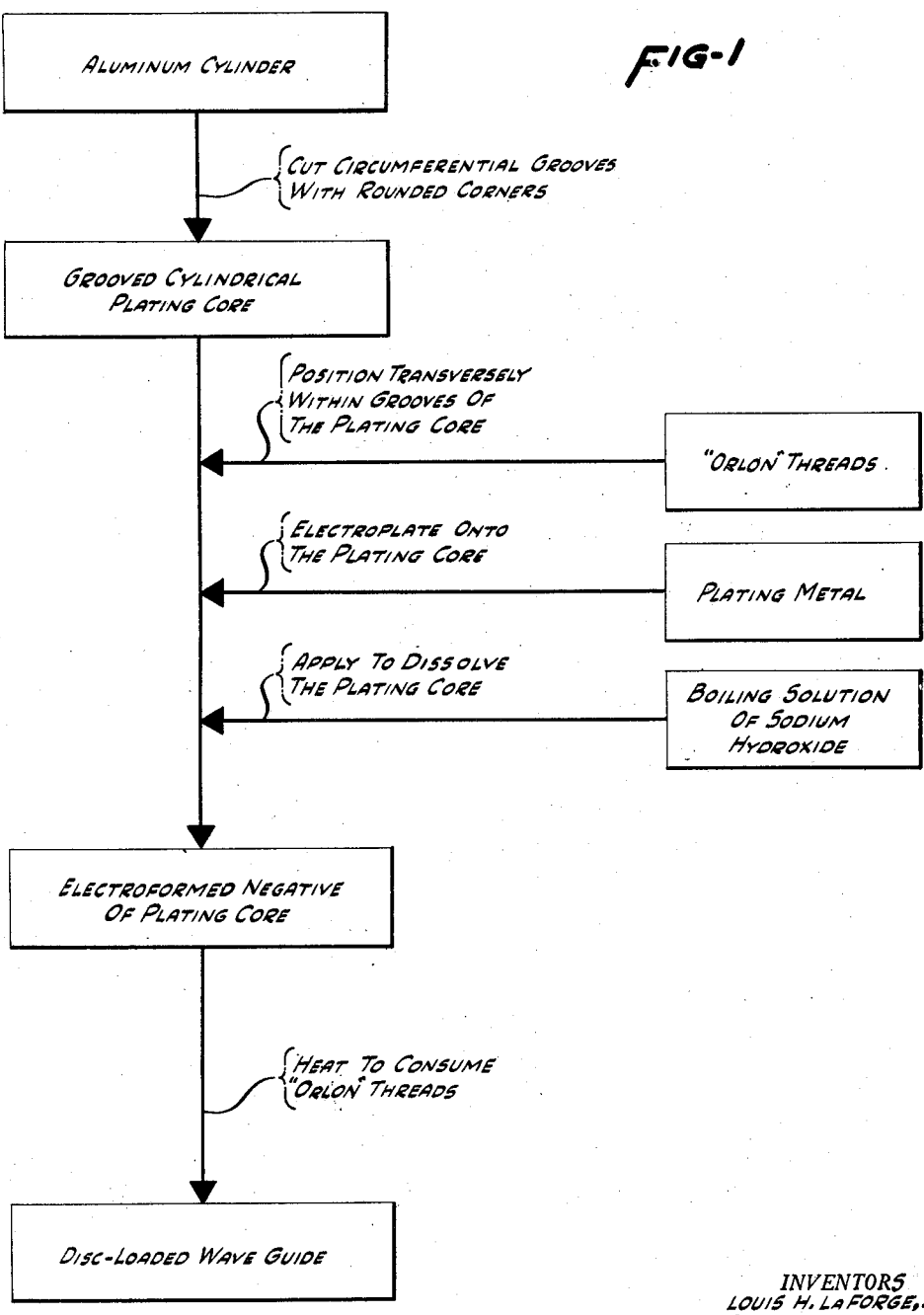

Referring now to the drawings, Fig. 1 is a largely self-explanatory flow diagram of an improved process for making disc-loaded waveguides. Circumferential grooves with rounded corners are cut into an aluminum cylinder to make a grooved cylindrical plating core. Since the outside surface of the core will correspond to the inside surface of the finished waveguide, the core grooves are cut with precisely the dimensions and spacings desired for the loading discs of the finished waveguides. For example, the grooves may be cut on a precision lathe using well-known high-precision machining techniques.

Threads of "Orlon" or an equivalent plastic material are positioned transversely within each groove of the core so that one or more threads extend from the central portion of each cavity to positions that will be either inside or outside of the finished waveguide. The plating core and the threads are immersed in a plating solution, and a plating metal, usually silver or copper, is electroplated onto the plating core.

Next the electroplated core is immersed in a hot, preferably boiling or near boiling solution of sodium hydroxide, or other etching solution, which dissolves the aluminum plating core but does not affect the silver or copper plating metal that has been deposited thereon. This leaves an electroformed negative of the plating core having an inside surface that is a precise replica of the outside surface of the core.

This replica is then heated, which may be done during the conventional evacuation and bake-out operations customarily performed in the manufacture of waveguide sections for linear accelerators and the like. The heat burns the "Orlon" threads to provide escape passages for any plating solution entrapped inside cavities within the plating metal. The end product of this process is a disc-loaded waveguide section of exceptionally high quality that is suitable for use in linear accelerators and the like.

Figure 2:
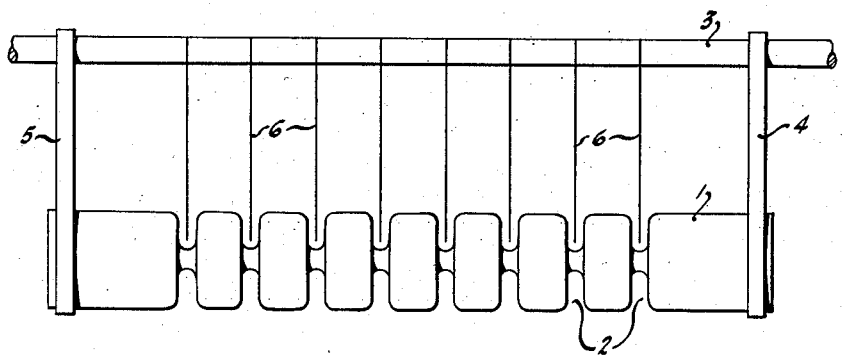
Fig. 2 is a schematic diagram showing a set-up of apparatus useful in practicing the invention.

Fig. 2 shows the aluminum plating core and the "Orlon" threads prepared and arranged for the start of the electroplating operation. The plating core 1 is an aluminum cylinder into which there has been cut a plurality of circumferential grooves 2. Preferably the outside corners of the grooves are rounded, as shown. The plating core is supported from and electrically connected to a metal bar 3 by metal straps or hangers 4 and 5, so that the plating core can be immersed in a plating solution and supplied with electric current in accordance with conventional electroplating practice. A plurality of "Orlon" threads 6 are supported in any suitable manner, for example, by attachment to bar 3. A thread 6 extends into each groove of the plating core, as shown.

Figure 3:
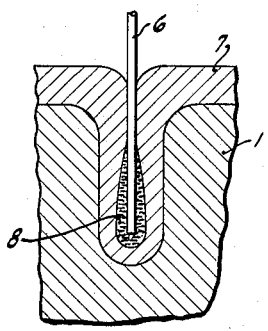
Fig. 3 is a fragmentary section of the plating core and the plating metal deposited in a groove thereof, showing a cavity containing entrapped plating solution and an "Orlon" thread to provide an escape passage for the entrapped solution.

Fig. 3 is a fragmentary section of the aluminum plating core 1, showing a portion of one circumferential groove therein, after a layer 7 of silver or copper plating metal has been electroplated onto its surface. Rounding the outside corners of the groove reduces the speed at which plating metal is deposited on the corners during the electroplating process, so that a thicker coating of plating metal can be obtained inside the groove before the outer portion of the groove is bridged and sealed over by the deposited plating metal. However, plating metal is still deposited on outer portions of the groove more rapidly than on inner portions of the groove, so that a cavity 8 filled with entrapped plating solution may be formed inside each loading disc of the waveguide.

An "Orlon" thread 6 extends from the interior of cavity 8 to the outside of the waveguide as shown. After core 1 is dissolved, plating metal 7, which is an electroformed negative of the plating core, remains to constitute a unitary disc-loaded waveguide section. When the waveguide section is heated, during evacuation and bake-out for example, thread 6 burns and leaves a passage connecting cavity 8 and the space outside the waveguide. The heat vaporizes plating solution 8, and the vaporized plating solution escapes through the passage left by the burned-out thread. If no escape passage were provided, the pressure created by the vaporization of the plating solution might damage the waveguide structure.

Figure 4:
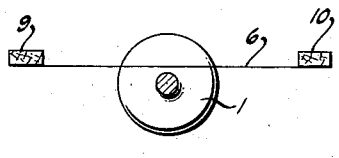
Fig. 4 is a schematic diagram showing an alternative way of supporting the thread during the plating operation.

Fig. 4 is a schematic diagram illustrating an alternative way of supporting threads 6. In Fig. 4, the plating core 1 is shown in a transverse section taken through one of its circumferential grooves. Threads 6 are stretched between two parallel members 9 and 10 of a supporting frame, and pass transversely through the grooves of the plating core, as shown. In this case, when the threads 6 are burned out, two passages are created between the cavity containing the entrapped plating solution and the outside of the waveguide.

Figure 5:
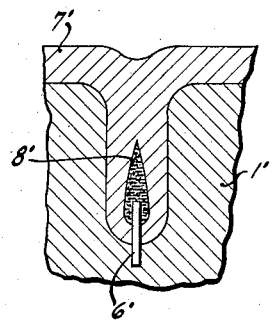
Fig. 5 is a fragmentary section of the plating core and plating metal deposited thereon, showing another alternative way of supporting the thread.

Fig. 5 shows still another way of supporting the threads. Plating core 1' may be identical to plating core 1 except that a small hole may be drilled into the plating core at the bottom of each circumferential groove. A short length of "Orlon" thread or an "Orlon" bristle 6' is inserted into each of these holes prior to the electroplating operation. After the electroplating operation, the deposited layer of plating metal 7' may contain a cavity 8' filled with entrapped plating solution. After core 1' has been dissolved, bristle 6' extends between cavity 8' and the inside of the waveguide. During bake-out, bristle 6' burns and the vaporized plating solution escapes to the inside of the waveguide and is drawn off by the evacuating apparatus.

It should be understood that this invention in its broader aspects is not limited to specific examples herein illustrated and described, and that the following claims are intended to cover all changes and modifications in the process that do not depart from the true spirit and scope of the invention.

What is claimed is:

1. The method for making disc-loaded waveguides, comprising the steps of positioning threads to extend into discoid grooves of a circumferentially grooved cylindrical plating core, electroplating metal onto said plating core, said metal substantially filling said grooves and covering said core to form a plurality of annular discs of said metal transversely disposed within and unitary with a cylinder of said metal, said discs containing internal cavities and said threads extending from said cavities through said metal plated on the said core, dissolving said plating core, and removing said threads.

2. The method for making disc-loaded waveguides, comprising the steps of cutting discoid circumferential grooves into a cylindrical plating core, postioning combustible threads to extend into said grooves, electroplating a metal onto said plating core, said metal substantially filling said grooves and covering said core to form a plurality of annular discs of said metal transversely disposed within and unitary with a cylinder of said metal, said discs containing internal cavities and said threads extending from said cavities through said metal, removing said plating core, and burning said threads.

3. The method for making disc-loaded waveguides, comprising the steps of cutting discoid circumferential grooves with rounded outside corners into an aluminum cylinder to form a grooved cylindrical plating core, positioning "Orlon" threads to extend into said grooves of said plating core, electroplating onto said plating core another metal that is resistant to chemical attack by hot solutions of sodium hydroxide, said metal substantially filling said grooves and covering said core to form a plurality of annular discs of said metal transversely disposed within and unitary with a cylinder of said metal, said discs containing internal cavities and said threads extending from said cavities through said metal, dissolving said plating core in a hot solution of sodium hydroxide to leave an electroformed negative of the plating core, and heating said electroformed negative at a temperature sufficient to consume said threads.

References Cited in the file of this patent

UNITED STATES PATENTS

| 1,477,109 | Coles | Dec. 11, 1923 |
| 2,761,828 | Eldredge et al. | Sept. 4, 1956 |
| 2,793,989 | Goodman | May 28, 1957 |

FOREIGN PATENTS

| 153,231 | Great Britain | Oct. 28, 1920 |
| 307,053 | Switzerland | Sept. 1, 1955 |